Patented Apr. 16, 1940

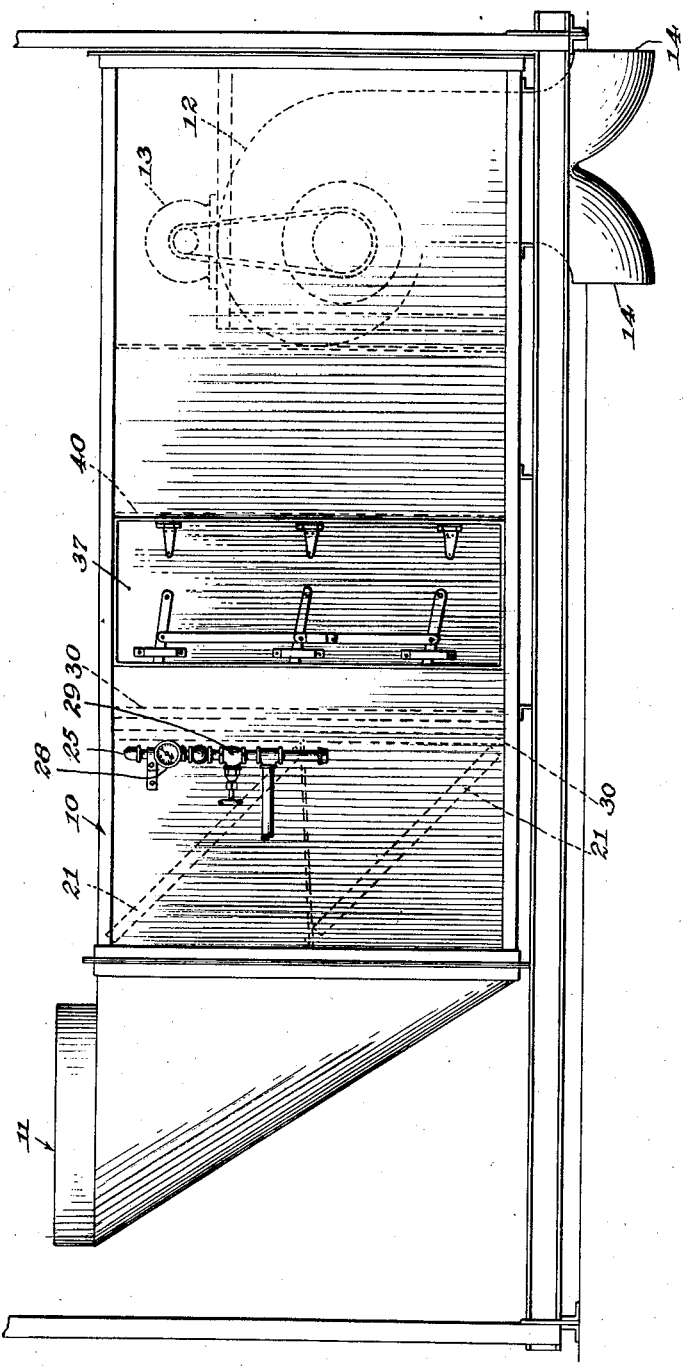

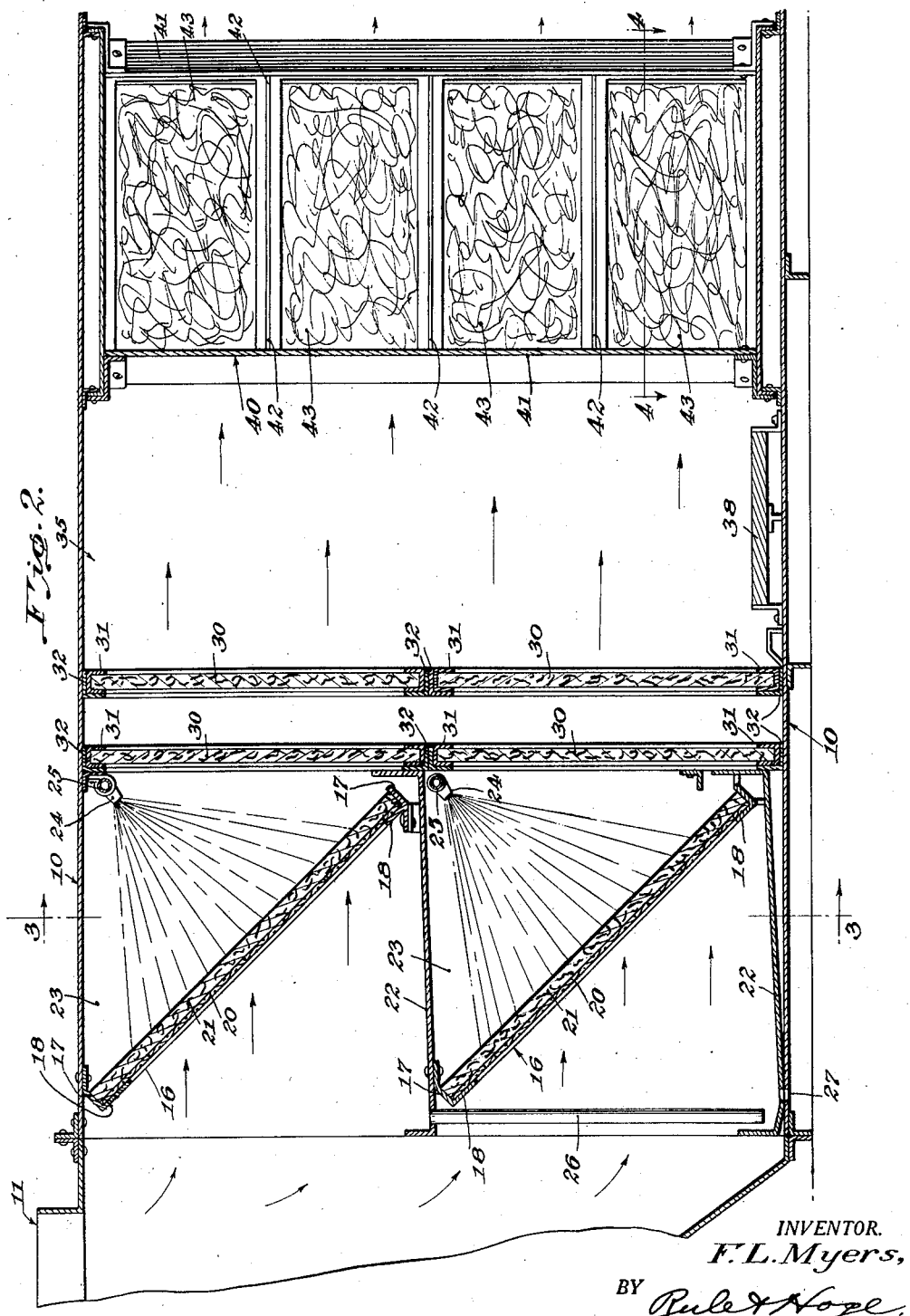

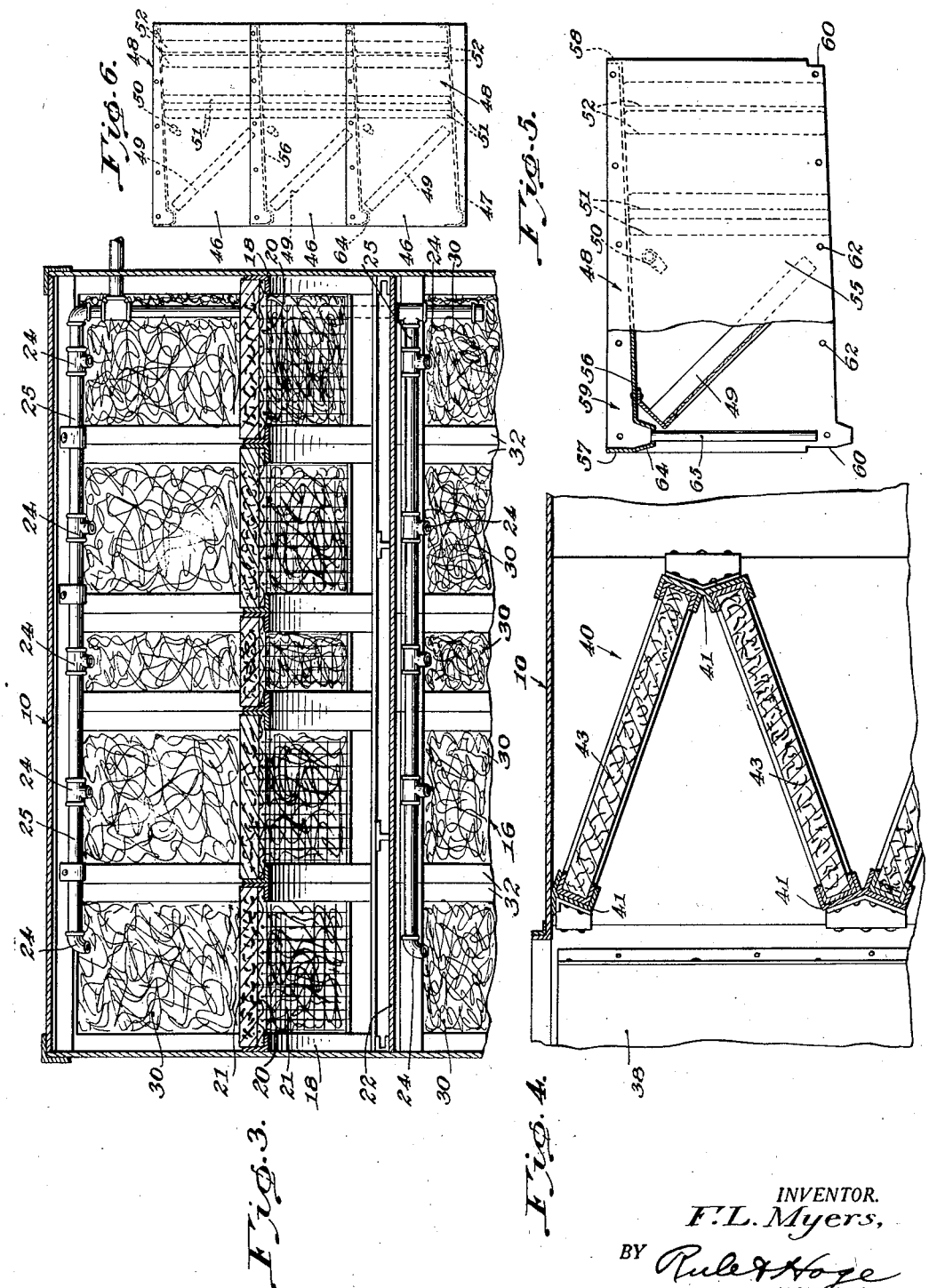

2,197,004

UNITED STATES PATENT OFFICE 2,197,004

AIR FILTERING APPARATUS

Frank L. Myers, Toledo, Ohio, assignor, by mesne assignments, to Owens-Corning Fiberglas Corporation, a corporation of Delaware Application October 30, 1937, Serial No. 171,954

2 Claims. (Cl. 183—9)

The present invention relates to an apparatus for air cleaning and more particularly to air filtering apparatus involving in part the use of a constant flow of filter adhesive over fibrous material.

One of the objects of the present invention is to provide an air cleaner especially adapted for filtering air extremely heavily laden with dust as, for example, in dust bowl areas, around quarries, mills, batch houses, or in smoky areas.

Another object of the invention is to provide for such conditions an air cleaning apparatus which may be substantially continuously operated without shut-down.

Another object of the invention is to provide air filtering apparatus which will take out not only the dust particles of larger size, but also extremely fine dust such as fly ash, dust carbon, smoke, etc., and also water soluble dust, dirt and gases.

Another object of the invention is to achieve a greater and more uniform distribution of liquid adhesive over the fibrous particles in an aqueous washer, and to facilitate impingement of dust and dirt particles upon the film of moisture. An ancillary object in this connection is to provide for an increase in surface area of the adhesive over the fibers without increasing the resistance to gas flow through the filtering apparatus.

Another object of the present invention is to provide an air filtering apparatus which is inexpensive to manufacture, simple in construction, and involves a low maintenance cost.

Other objects and advantages of the present invention will become apparent from the following description, taken in conjunction with the drawings, in which:

Fig. 1 is a side elevational view of an air filtering apparatus embodying the present invention;

Fig. 2 is a fragmentary cross-sectional side elevational view of the filtering apparatus shown in Fig. 1;

Fig. 3 is a front cross-sectional elevational view of the apparatus shown in Fig. 2, the section being taken along the line 3—3;

Fig. 4 is a fragmentary cross-sectional plan view of the dry filtering portion of my apparatus, the section being taken along the line 4—4 of Fig. 2;

Fig. 5 is an elevational side view shown partly in section of a modified embodiment of the present invention, being a single unit adapted to be built up in banks to any desired size; and Fig. 6 is an elevational view of a plurality of units shown in Fig. 5, nested together to form a bank thereof.

The present invention includes a fibrous mat preferably composed of long, attenuated and reticulated glass fibers arranged in jackstraw formation to provide open circuitous passages for the air to travel, and supplied with a constant supply of water or aqueous solution or suspension acting as a filter adhesive upon which the dust particles impinge and are thus washed away. The fibrous mat should be of glass fibers in order to prevent attack by the water and to prevent deterioration of the fibrous mass during the life of the units. The air then preferably passes through a spray chamber which supplies the fibrous filter mat with a constant supply of aqueous filter adhesive. A portion of the dust particles remaining in the gas are removed in this spray chamber. The gas is then passed through an eliminator mat also composed of a fibrous glass mass of reticulated fibers serving to remove the entrained moisture.

It has been found that certain types of dust particles are not necessarily caught by this unit, and in order to remove the last particles, I have found especially adapted therefor a dry filter unit composed of a bank of individual dry replacement filter units composed of a fibrous glass mat covered with a suitable filter adhesive such as tricresyl phosphate, other phosphate, or the like. Oil, combinations of oils, waxes and/or soaps and other filtering mediums may also be used although certain disadvantages such as continual flowability or lack of fireproofness may accompany the use of these materials.

As a result of the combination of the wet and the dry filter units in the order named, I have discovered that a substantially complete elimination of the dust and dirt particles may be effected substantially continuously without shutdown or premature loading of the filtering material, even though they are acting upon extremely heavily laden air.

Referring now more particularly to the drawings, reference character 10 designates a casing in which my novel filtering apparatus may be enclosed. Dust laden air is admitted through an inlet 11 and is drawn through the apparatus by means of a blower 12, actuated by a suitable motor 13, driving the clean air out through the outlet 14. Mounted within the casing 10 near the intake side of the apparatus are one or more frames 16 which may be superimposed one upon or above another as shown, in order to provide the required filtering capacity. The frames 16 comprise a rectangular cell 17 and inwardly projecting flanges 18 serving as supporting members. A screen 20 may be stretched across the openings.

Supported within each frame 16 is a fibrous mat 21 composed of fibrous glass preferably laid in open criss-cross formation and extending predominantly parallel to the face of the mat. The mat may be bonded with a suitable adhesive such as latex, resin or the like.

The frames 16 and the respective filter mats 21 are preferably inclined at an angle to the horizontal as, for example, between about 30° to 55°, preferably about 45°, and thus form chambers 23 on the exhaust side of the mat 21.

The superimposed frames 16 are divided from each other by means of deck plates 22 extending from the lower end of one framework 16 to the upper end of the next lower framework 16. The deck plate 22 is preferably inclined slightly toward the forward end whereby any liquid which may drip or flow from the mat 21 will flow downwardly to the forward end and be conducted through conduits 26 to the lowermost deck plate 22 where it is discharged through the outlet opening 27. If desired, the dust laden liquid may be centrifuged, filtered, skimmed off, decanted, or otherwise freed from the dirt and recirculated into the system.

At the upper end of each of the chambers 23 are provided one or more spraying means 24 adapted to fill the chamber 23 with an aqueous spray which impinges upon and is caught by the individual fibers of the mat 21. Supply pipes 25, provided with a suitable pressure gauge 28 and valve 29 (see Fig. 1) may be provided to introduce the liquid to the spray 24 at a predetermined pressure. If desired, the liquid may be introduced directly into the top of the mats 21.

At the discharge end of the chambers 23 are one or more eliminator mats 30, also preferably composed of fibrous glass mats, secured in a suitable carton or holder 31 and removably fitted in a vertical frame 32.

On the discharge side of the eliminator mats 30 is a chamber 35, acting as a plenum chamber and also providing accessibility to an operator for the replacement and arrangement of the mats 30 and 21. As shown in Fig. 1 a suitable door 37 may be provided in the casing 10 leading into the chamber 35 through which an operator may pass in reaching the interior of the casing. A suitable board walk 38 may be provided on the floor of the chamber 35 upon which an operator may comfortably stand.

After the air passes through the chamber 35 it is then led through a dry filter bank 40 which may be constructed in the manner more fully illustrated and described in the Myers and Smith Patent No. 2,044,221 patented June 16, 1936. The filter bank is preferably of the V-type and comprises a plurality of risers 41 arranged in staggered relationship and divided horizontally at intervals by deck plates 42 interconnecting the risers 41 to provide a zigzag framework having cells therein adapted to receive filter units 43. Each of these filter units may be composed of fibrous glass mats coated with a suitable adhesive such as tricresyl phosphate, oil, combinations of oils, waxes, and/or soaps or the like. The dry filter bank is adapted to catch and retain the residual dust passing through the wet filter unit, and when each individual filter unit 43 has been filled or loaded with dust and dirt, it may be replaced by a new one and the old one thrown away. After the air has passed through the dry filter bank, it has been cleaned and purified, and then may pass out through the outlet 14 under the impulse from the blower 12.

In operation of the device the sprays emanating from the spraying means 24 impinge upon the discharge side of the mat 21 where they provide a continual adhesive coating for each of the individual fibers. The liquid then drips or flows downwardly, predominantly on the intake face of the filter mat 21. By thus concentrating primarily on the intake side of the filter mat, the major portion of the dust and lint particles which originally impinge upon the intake side of the filter mat, are continually washed away. In this connection, it is to be noted that the flow of water through the filter mat is in a direction opposite to the flow of air, this counter-current flow operating to prevent dirt particles from being driven constantly into the mat to cause it to clog up. On the contrary, the flow of moisture through the mat from the discharge side to the intake side serves to continually wash the mat free of dust and dirt particles and causes it to be washed out to the intake face of the mats 21 and downwardly onto the deck plates 22 where it is removed.

Referring now more particularly to Figs. 5 and 6, I have illustrated a plurality of air filter units, each comprising wet and dry air filter elements. Each of these air filter units may be combined with and nested with similar air filter units to form a bank thereof in order to provide the desired air filtering capacity. In Fig. 6 a bank of three such units 46 has been nested together, and a bottom splash pan member 47 applied to complete the assembly. Each unit 46 comprises a casing 48, a wet filter mat 49, spraying nozzles 50, eliminator mats 51 and dry filter mats 52, each of the units arranged in suitable frames which securely hold them into place and facilitate their replacement.

Fig. 5 illustrates a form of construction of a casing 48. It will be noted that the casing comprises side walls 55, and a deck plate 56 which is located in proximity to the upper edges of the walls 55. Front and rear wall sections 57 and 58 respectively are provided at the upper portion of the casing, and form with the upper edges of the walls 55 a receiving nest 59 adapted to receive the lower edges of a similar casing which may be seated therein. The open spaces below the front and rear wall sections 57 and 58 serve as an inlet and outlet, respectively. The lower edges of the side walls 55 are preferably provided with recesses 60 around the periphery thereof adapted to fit into a receiving nest 59. Rivets or bolts may be provided at the points 62 to secure juxtaposed casings together.

The deck plate 56 is preferably provided with a trough 64 at the forward end thereof adapted to collect the water which flows from the wet filter mat 49 of the unit next above the deck plate 56. A conduit 65 is also preferably provided to conduct the water downwardly to the next lower deck plate 56.

The operation of this device is similar to that disclosed in Figs. 1 to 4, the air first traveling through the wet filter mat 49, then through the liquid spray from the spray nozzle 50, then through the eliminator mats 51 adapted to remove entrained moisture and then through the dry filter mats 52 adapted to remove the last remaining portions of dust particles, thus rendering the air cleaning highly efficient and substantially completely effective regardless of extremely high dust concentrations.

Another feature of the present invention is the use of means for decreasing the surface tension of the water or other liquid which is used, and for this purpose various substances may be used such as soap, colloidal suspensions, or the like. By lowering the surface tension of the liquid, it is possible to greatly increase the distribution of liquid over the fibers, and also facilitate impingement of the dirt particles upon the film of moisture. Thus while some dirt particles might find difficulty in penetrating a drop of ordinary moisture owing to the surface tension of the latter, it is possible for the particles to easily penetrate through the skin of a soap solution or suspension. Mineral oils and soda ash may also be used if desired. The soap solution may also serve to emulsify the dirt which accumulates, rendering it a relatively simple matter to skim off and remove, whereby the liquid may be reused.

Oil or the like may also be used as the filter adhesive of the wet unit, although this is generally not advisable for some uses since there is a tendency of the air to pick up small oil particles and deposit them on the walls of subsequent conduits or rooms of buildings. Water and oil emulsions may also be used to advantage.

With regard to regulating humidity, it is possible to do so by regulating the temperature of the liquid adhesive in the wet unit. By lowering the temperature of the liquid, the air may be dehumidified, and by raising the temperature of the liquid above that of the air, the air is humidified.

Modifications may be resorted to within the spirit and scope of the appended claims.

I claim:

1. Air filtering apparatus comprising a casing having an air inlet and air outlet, a thin fibrous glass mat consisting of long glass fibers in open jackstraw arrangement to provide open circuitous passages for the air to travel through said mat and permitting the ready passage of air therethrough mounted in proximity to said inlet and inclined at an angle to the vertical having its intake face facing downwardly, liquid spraying means mounted over said mat and adjacent the said air outlet adapted to throw a spray of moisture against said mat and fill the intervening space with a moisture fog through which the air passes in a countercurrent direction, the major portion of the moisture which impinges on said mat flowing therethrough countercurrently to said air flow and continually washing the dirt arrested at the intake face of said mat downwardly to be eliminated, and a second such fibrous glass mat mounted in an upright position on the discharge side of said first mentioned mat and behind said spraying means at said outlet adapted to remove entrained moisture from the air passing through said fog and cause the same to flow downwardly and be eliminated along with dirt particles trapped by said moisture.

2. Air filtering apparatus comprising a casing having an air inlet and air outlet, a thin fibrous glass mat consisting of long glass fibers in open jackstraw arrangement to provide open circuitous passages for the air to travel through said mat and permitting the ready passage of air therethrough and mounted in proximity to said inlet, said mat inclined at an angle to the vertical having its intake face facing downwardly, liquid spraying means adjacent said air outlet arranged and adapted to throw a spray of moisture under pressure through the intervening space against said mat and fill the intervening space with a moisture fog through which air passes in a countercurrent direction to the throw of said spray, the major portion of the moisture which impinges on said mat flowing therethrough countercurrently to said air flow and continually washing the dirt arrested at the intake face of said mat to be eliminated, a second such thin fibrous glass mat mounted in an upright position behind said spraying means at said outlet adapted to have a substantial portion of said moisture fog impinge upon the fibers thereof by movement of the air passing through said fog and said second mentioned mat to cause said second mentioned mat to be drenched with moisture and collect remaining dirt particles in the air and cause the same to flow away and be eliminated along with the dirt particles trapped by said moisture when in said intervening space, and a third such fibrous glass mat mounted in an upright position at the discharge side of said second mat and spaced away therefrom adapted to remove remaining moisture particles from the air passing therethrough and permit the same to be eliminated.

FRANK L. MYERS.